Oct. 13, 1925.        1,557,175
C. W. LARNER
VALVE
Filed July 14, 1922        3 Sheets-Sheet 3
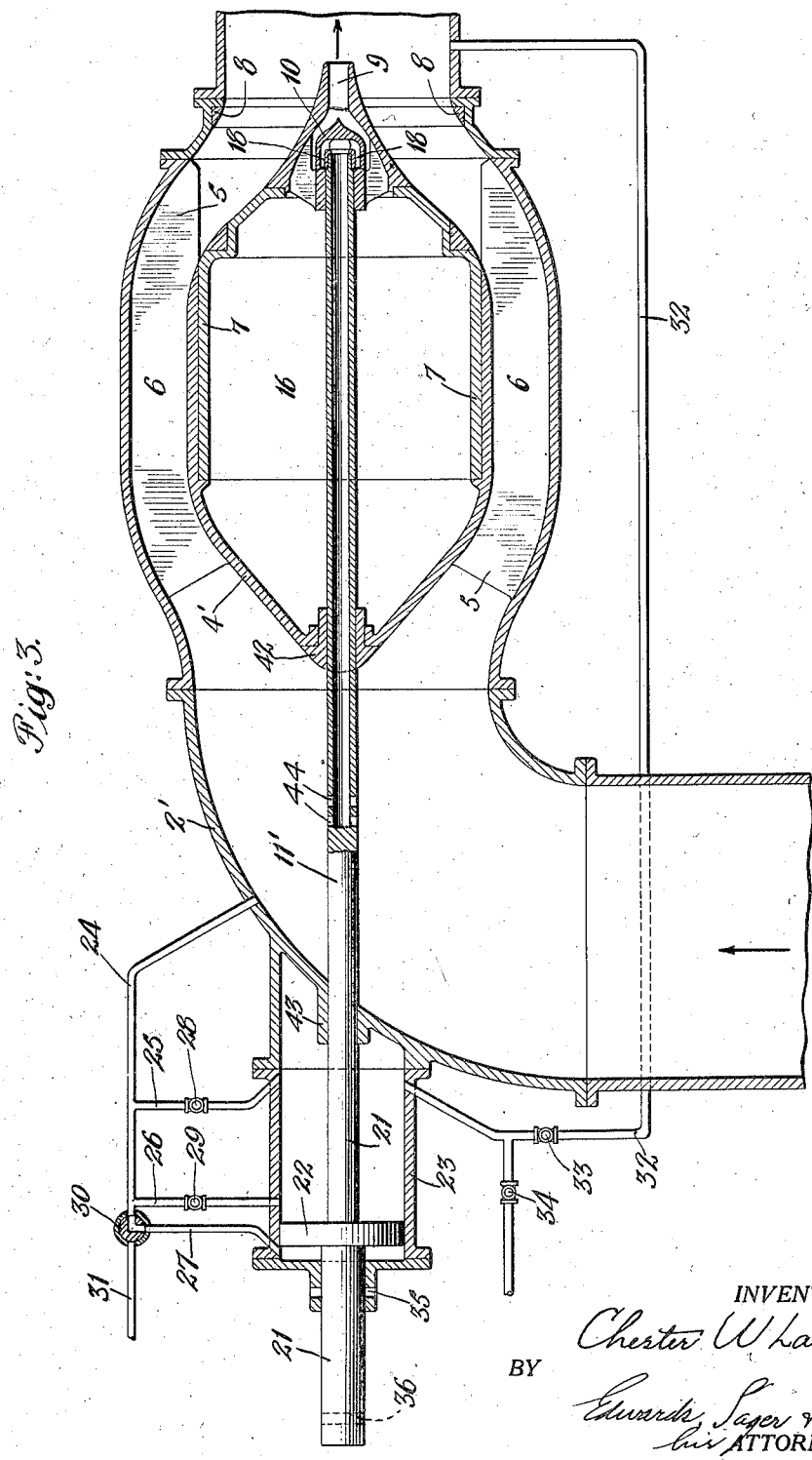
INVENTOR
Chester W Larner
BY
Edwards, Sager & Bower
his ATTORNEYS Patented Oct. 13, 1925.

1,557,175

UNITED STATES PATENT OFFICE.

CHESTER W. LARNER, OF PHILADELPHIA, PENNSYLVANIA, ASSIGNOR TO WILLIAM CRAMP & SONS SHIP AND ENGINE BUILDING COMPANY, A CORPORATION OF PENNSYLVANIA.

VALVE.

Application filed July 14, 1922. Serial No. 574,887.

*To all whom it may concern:*

Be it known that I, CHESTER W. LARNER, a citizen of the United States, residing at Philadelphia, in the county of Philadelphia and State of Pennsylvania, have invented certain new and useful Improvements in Valves, of which the following is a specification.

This invention relates to flow control valves of the "Johnson" type and particularly to the control of the movable plunger element of such valves. The chief object of the invention is to provide a valve in which the plunger element will have a fluid pressure operated control means outside of the conduit. A further object of the invention is to provide such a valve which will be automatically self-closing at a predetermined rate under certain conditions such as a break in the conduit beyond the valve.

In the accompanying drawings illustrating the invention—

Figs. 2 and 3 are similar views of modifications.

Figure 1:
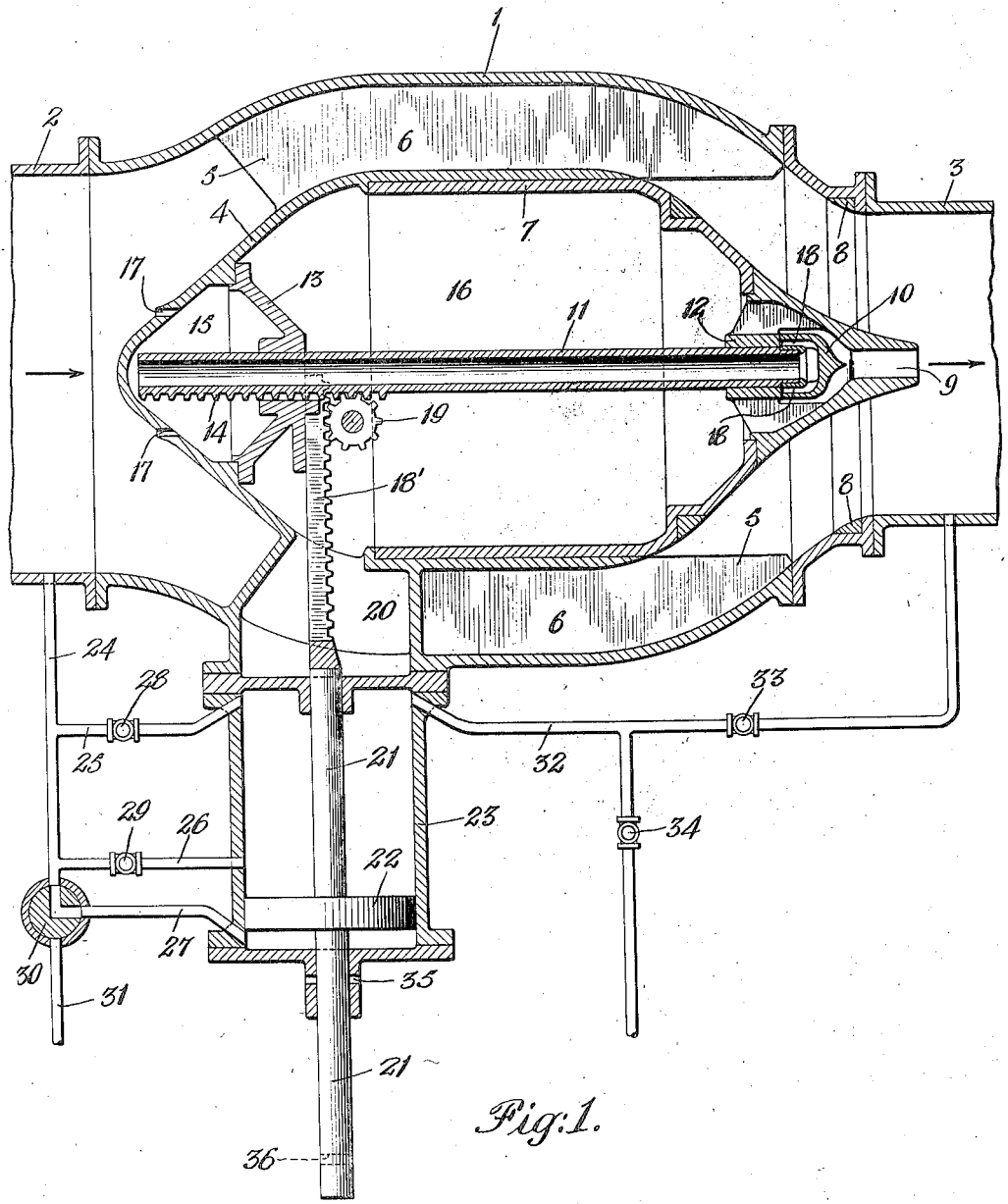
Fig. 1 is a vertical sectional view of a valve and control means therefor.

In the specific embodiment of the invention illustrated in Fig. 1 the valve comprises an outer body 1 forming an enlarged portion of the conduit and connected at the inlet end to a pipe or conduit 2 and at the outlet end to a pipe 3. An internal cylindrical body 4 is supported within the valve by radial ribs 5 to provide an annular passage or waterway 6 through the valve and this internal cylinder 4 has sliding within a plunger element 7 adapted to seat against the contracted end of the body 1 at 8 to shut off the flow through the valve.

The plunger 7 is provided with an aperture 9, the flow through which is regulated by a pilot valve 10 mounted on a tubular stem 11. The stem 11 is guided at the front end by a bearing 12 integral with the plunger and at the rear end by a bearing 13 which is stationary and attached to the internal cylinder 4. Stem 11 has a rack 14 at the rear end and the opening through bearing 13 fits closely around stem 11 and rack 14, thus acting as a guide and also separating chamber 15 from chamber 16 and making it possible to have different pressures in these two chambers. The pressure of pipe line 2 is freely admitted to chamber 15 through ports 17. The pressure in 15 is admitted to 16 through stem 11 and ports 18 whenever pilot valve 10 moves away from bearing 12 toward its seat at the entrance to aperture 9. The pressure in chamber 16 is exhausted through aperture 9 when pilot valve 10 is in the position shown in Fig. 1 and the discharge of pressure is cut off when pilot valve 10 is moved forward to close aperture 9.

It is thus seen that as pilot valve 10 is moved forward pipe line pressure is admitted to chamber 16 behind plunger 7 and the exhaust from chamber 16 is simultaneously reduced. The forward motion of the pilot valve thus builds up behind plunger 7 a pressure sufficient to move it in the same direction as the movement of the pilot valve until finally plunger 7 seats at 8 and pilot valve 10 seats against aperture 9, thus closing the valve and stopping the flow.

The plunger 7 is unseated and opened by moving pilot valve 10 in the opposite direction, the pressure in chamber 16 being thus progressively reduced until the pressure on the nose of plunger 7 is sufficient to move it. Fig. 1 shows plunger 7 and pilot valve 10 in the final open position, the flow through ports 18 being entirely cut off and the plunger being mechanically held in the open position by the contact of pilot valve 10 against bearing 12.

The movement of stem 11 is accomplished by a forked rack 18' which straddles rack 14 and engages an idler pinion 19 which also engages rack 14. Pinion 19 serves to translate the axial movement of stem 11 into a direction at right angles thereto as shown by the drawing but it is obvious that this arrangement may be utilized with angles other than 90 degrees between racks 14 and 18' if desired. It is also obvious that other means well known in the art such as levers and bell cranks, may be utilized in place of the rack and pinion engagement.

Rack 18' passes through a hollow chamber 20 formed by spreading one of the radial ribs 5 so as to avoid communication between the passageway 6 and chamber 16. Rack 18' is connected to a piston rod 21 attached to a piston 22 in a cylinder 23 mounted on the outside of the valve body 1 as shown. Pressure from pipe 2 is supplied to three points in cylinder 23 by pipes 24, 25, 26 and 27. The supply of pressure in 25 and 26 is controlled by valves 28 and 29. The pressure supplied through 27 is controlled by a threeway cock 30 which may also be utilized to exhaust pressure from pipe 27 through pipe 31 to the atmosphere or any other region of relatively low pressure.

The upper end of cylinder 23 beyond the limit of the piston stroke is connected to a point in the conduit beyond the valve by means of pipe 32. This pipe is provided with a valve 33 and an exhaust branch with valve 34 and by closing valve 33 and opening 34 the pressure above piston 22 may be exhausted.

For normal operation with the plunger 7 open, connections 26 and 27 to pipe 2 are open by opening the corresponding valves 29 and 30 and valve 28 is closed to close pipe 25. Connection 32 is also open. Substantially conduit pressure will exist in cylinder 23 on both sides of piston 22 but since piston rod 21 extends through the lower head of cylinder 23 the pressure inside the valve will be exerted upon the cross-sectional area of the piston rod which is exposed to atmospheric pressure and thus this unbalanced force will be communicated through the gearing and pilot valve 10 to plunger 7 and serve to hold it mechanically in the open position. If desired the extended end 36 of the piston rod may be made larger than the rod 21 so as to give an excess of downward pressure on the piston 22.

If a break should occur in the conduit beyond the outlet end of the valve a drop of pressure will be communicated through pipe 32 to cylinder 23 and since full pressure will be maintained below the piston through pipe 27 the piston and connected parts will move upward and close plunger 7. It is, of course, important to regulate the rate of closing in order to avoid water hammer in the conduit and this is facilitated by locating pipe 26 in such a position as to be cut off by piston 22 soon after it begins to move. This permits the drop of pressure through pipe 32 to take full effect and the regulation of the piston movement becomes more positive since all of the displacement of the piston must be exhausted through pipe 32 and while this is taking place no pressure is being admitted to the same side of the piston. It is thus possible by proper setting of valve 33 or by connecting pipe 32 to cylinder 23 at several other points in the stroke, each of which may be separately throttled by a corresponding valve, to secure any desired rate or characteristic of closing. The stroke of plunger 7 may be made slow throughout its entire length, or the first part of the stroke may be made rapid and the latter part slow, or it may be graduated from a rapid start to a slow finish as conditions may require.

When plunger 7 and pilot valve 10 are closed they may be held in this position by hydraulic pressure if the circle of contact between pilot valve 10 and the plunger is made larger than piston rod 21 as shown in Fig. 1. In that event, the unbalanced area of 10 will be greater than that of 21 and pilot valve 10 will be held in the closed position. If it is desired to lock the valve closed it may be done mechanically as, for example, by a pin put through the holes 35 and 36, or in any other suitable manner. If when plunger 7 is open it is desired to close it manually instead of automatically this may be done by closing valve 33 and opening valve 34, thus exhausting pressure from above piston 22.

When plunger 7 is closed it may be opened with valves 33, 34 and 29 closed, valve 28 open and pipe 27 exhausted through pipe 31. After plunger 7 has been thus opened, however, valve 28 is closed, valve 29 is opened and pipe 27 is connected to 24. The mechanism is set for automatic closing, with valve 34 closed and valve 33 open.

The position of cylinder 23 is immaterial to the operation of the valve where fluids are used in the conduit but if used with steam there is an advantage in placing cylinder 23 on the underneath side of the valve as drawn. When so placed the cylinder will fill with water by condensation and this is a condition favorable to reliable regulation of the rate of automatic closing since the rate of discharge through pipe 32 is more readily controlled with water than with steam.

It will also be obvious that plunger 7 may be operated by piston 22 and cylinder 23 without the use of pressure from the conduit in cylinder 23. This pressure may be supplied from other sources and may be controlled in other ways as, for example, by a centrifugal governor, the valve being utilized as a throttle valve in connection with a prime mover such as a water wheel or a steam engine or turbine.

Figure 2:
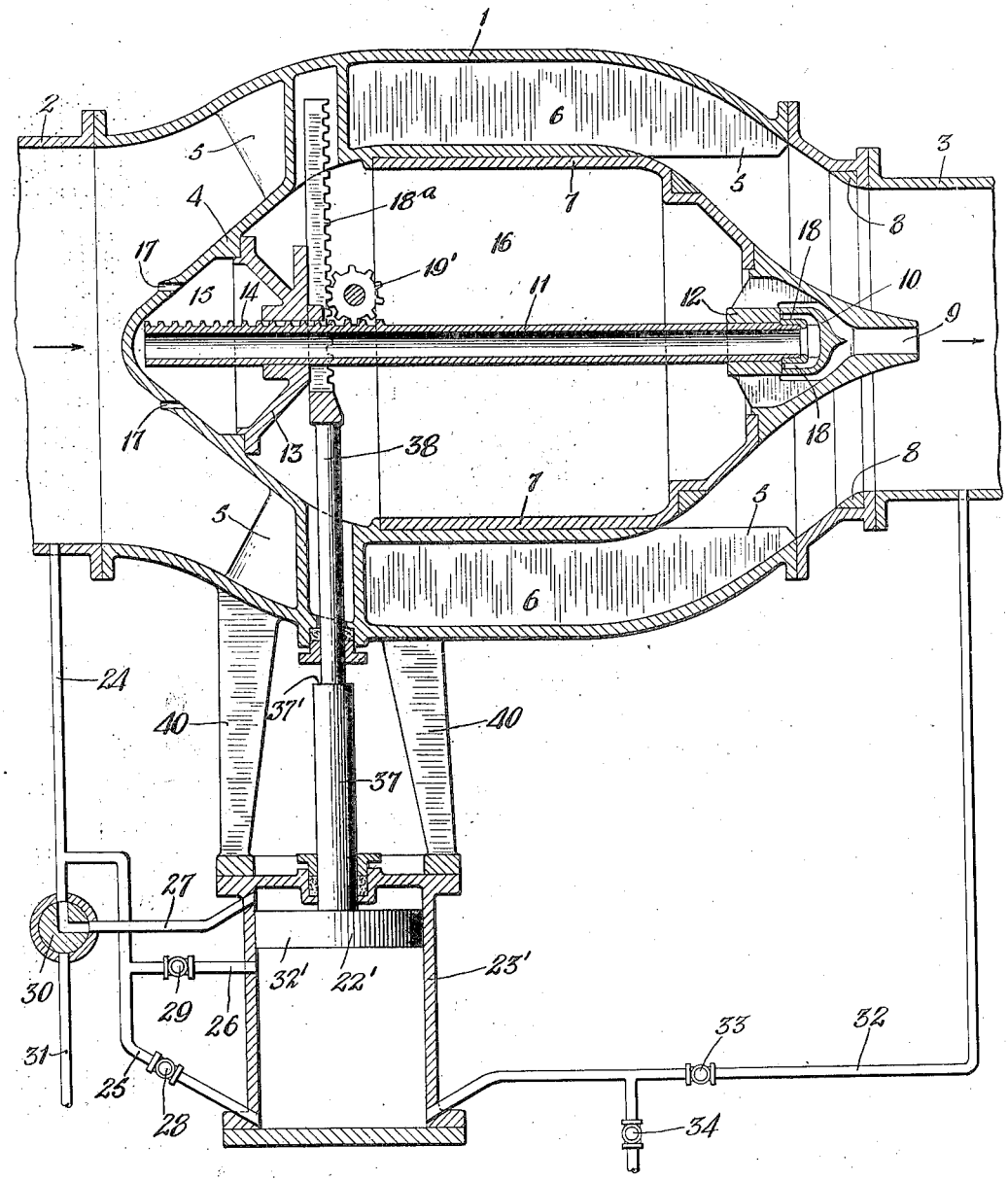

In the modification shown in Fig. 2 the pinion 19' is placed above the stem 11 and when the valve plunger 7 is open the rack 18ª is in uppermost position instead of being in lowermost position as in Fig. 1. The rack, rod or piston is divided into an upper part 38 of smaller diameter and a lower part 37 of larger diameter, the cylinder 23' and the piston 22' being spaced from the valve body 1 by the supporting frame 40. The atmospheric pressure on the annular shoulders 37' is overbalanced by the conduit pressure exerted upward on a corresponding area of the lower face 32' and this excess of upward pressure furnishes the force to hold stem 11 retracted and plunger 7 open. The pressure and exhaust connections to the cylinder 23' will, of course, be reversed as shown.

In the valve shown in Fig. 3 the entering pipe 2' is in the form of an elbow and the stem 11 of the valve plunger is extended out through the bearing 42 of cylindrical body 4' and through bearing 43 of the elbow 2' to directly carry the piston 22 without the interposition of any gearing. Chamber 15 of Fig. 1 is omitted and chamber 16 is connected to the conduit pressure by openings 44 in the hollow extended stem 11'. The cylinder 23, piston 22 and fluid pressure connections are similar to those in Fig. 1 but arranged horizontally instead of vertically.

In the valve of this invention fluid pressure operating means controls the fluid pressure on the interior of the valve plunger 7 so as to move and hold the valve in any desired adjustment. The fluid pressure operating means does not directly move the valve plunger under normal flow conditions but simply causes the valve plunger to be moved or balanced by varying the internal pressure within the plunger. This fluid pressure operating or control means is accessibly positioned outside of the conduit, leaving the connections within the conduit and valve plunger chamber of a simple mechanical nature. The valve mechanism is also formed to be automatically actuated by the occurrence of an abnormal condition such as a break in the line beyond the valve and the closing of the valve in case of such an emergency is automatically regulatable to give the highest safe rate of closing.

I claim:—

1. In a valve for a conduit the combination with an outer conduit casing, of an inner body having a sliding plunger element seating against a tapered portion of said outer casing, said inner body and sliding plunger being formed with fluid pressure operating means to move said plunger and comprising a fluid pressure controlling valve within the conduit, fluid pressure control means exterior to said conduit for controlling said fluid pressure operating means, and a mechanical connection between said exterior control means and said fluid pressure controlling valve within the conduit.

2. In a valve for a conduit the combination with an outer conduit casing, of an inner body having a sliding plunger element seating against a tapered portion of said outer casing, said inner body and sliding plunger being formed with fluid pressure means to move said plunger, an interior mechanical control means within said inner body for controlling said fluid pressure moving means, and fluid pressure means exterior to said conduit for actuating said control means.

3. In a valve for a conduit the combination with an outer conduit casing, of an inner body having a sliding plunger element seating against a tapered portion of said outer casing, said inner body and sliding plunger being formed with fluid pressure operating means to move said plunger, and comprising a fluid pressure controlling valve, fluid pressure control means exterior to said conduit for controlling said fluid pressure moving means, and a mechanical connection between said fluid pressure operating means and said control means, said fluid pressure control means being connected to said conduit to automatically close said plunger upon occurrence of abnormal conditions in said conduit.

4. In a valve for a conduit the combination with an outer conduit casing, of an inner body having a sliding plunger element seating against a tapered portion of said outer casing, said inner body and sliding plunger being formed with fluid pressure means to move said plunger, an interior mechanical control means within said inner body for controlling said fluid pressure moving means, and fluid pressure means exterior to said conduit for actuating said control means, said exterior actuating means being connected to said conduit to automatically close said plunger upon occurrence of abnormal conditions in said conduit.

5. In a valve for a conduit the combination with an outer conduit casing, of an inner body having a sliding plunger element seating against a tapered portion of said outer casing, said inner body and sliding plunger being formed with fluid pressure operating means to move said plunger and comprising a fluid pressure controlling valve, fluid pressure control means exterior to said conduit for controlling said fluid pressure moving means, a mechanical connection between said fluid pressure operating means and said control means, and a connection between said fluid pressure control means and said conduit adapted to automatically close said plunger at a predetermined rate upon occurrence of abnormal conditions in said conduit.

6. In a valve for a conduit the combination with an outer conduit casing, of an inner body having a sliding plunger element seating against a tapered portion of said outer casing, said inner body and sliding plunger being formed with fluid pressure means to move said plunger, and interior mechanical control means within said inner body for controlling said fluid pressure moving means, fluid pressure means exterior to said conduit for actuating said control means, and a connection between said exterior actuating means and said conduit adapted to automatically close said plunger at a predetermined rate upon occurrence of an abnormal condition in said conduit.

7. In a valve for a conduit the combination with an outer conduit casing, of an inner body and co-operating sliding plunger adapted to seat against a tapered portion of said casing, fluid pressure moving means for said plunger comprising an opening from the interior of said plunger to said conduit, a movable member adapted to control said opening, and means for moving said control member comprising fluid pressure operated means located outside of said conduit.

8. In a valve for a conduit the combination with a conduit casing, of an inner body and cooperating sliding plunger adapted to seat against a tapered portion of said casing, fluid pressure means for moving said plunger comprising a movable member adapted to control the entrance of pressure to the space within said inner body and plunger, and means for moving said member comprising a fluid pressure operated means outside of said conduit.

9. In a valve for a conduit the combination with an outer conduit casing and an inner body, of a movable plunger cooperating with the inner body and adapted to seat against a tapered portion of said casing, means for moving said plunger comprising a valve opening to the interior of said plunger and conduit, and fluid pressure means for automatically shutting said valve opening to close said plunger upon the occurrence of abnormal conditions in said conduit.

10. In a valve structure for a conduit an inner body within the conduit, a movable plunger cooperating with said body, an opening from the interior of said body to said conduit, another opening between the interior of said body and the interior of said plunger, a partition between said interiors, and fluid pressure operated means for controlling the relative fluid pressures on opposite sides of said partition.

11. In a valve structure for a conduit an inner body within the conduit, a movable plunger cooperating with said body, an opening from the interior of said body to said conduit, another opening between the interior of said body and said plunger, a partition between said openings and fluid pressure operated means for controlling the relative fluid pressures on opposite sides of said partition comprising a connection to the conduit adapted to cause an automatic closing of the valve plunger upon the occurrence of abnormal conditions in the conduit.

12. In a conduit valve of the Johnson type a pilot valve between the interior of the valve plunger and the conduit comprising a valve member having axially directed ports connected to be supplied from the fluid way and surfaces closing said ports when said valve is retracted to open the connection between the interior of the plunger and the fluid way.

13. In a conduit valve the combination with a valve plunger adapted to be moved by fluid pressure, of means for controlling said fluid pressure comprising a pilot valve within the conduit, and fluid pressure operated means controlling said pilot valve and located outside of said conduit.

14. In a conduit valve the combination with a valve plunger adapted to be moved by fluid pressure, of means for controlling said fluid pressure comprising a pilot valve within the conduit, and fluid pressure operated means controlling said pilot valve and located outside of said conduit and having a conduit connection adapted to automatically actuate said fluid pressure means to close said valve plunger upon the occurrence of abnormal conditions in said conduit.

15. In a conduit valve the combination with a valve plunger adapted to be moved by fluid pressure, of means for controlling said fluid pressure comprising a pilot valve, fluid pressure operated means controlling said pilot valve and located outside of said conduit and having a conduit connection adapted to automatically actuate said fluid pressure means to close said valve plunger upon the occurrence of abnormal conditions in said conduit, and means for predetermining the rate of closing of said plunger.

16. In a conduit valve the combination with a valve plunger adapted to be moved by fluid pressure, of means for controlling said fluid pressure comprising a pilot valve, fluid pressure operated means controlling said pilot valve and located outside of said conduit and having a conduit connection adapted to automatically actuate said fluid pressure means to close said valve plunger upon the occurrence of abnormal conditions in said conduit, and means for predetermining the rate of closing of said plunger comprising a plurality of connections between said fluid pressure operated means and said conduit.

17. In a conduit valve of the Johnson type means for controlling the pressure within the valve plunger comprising a pilot valve controlling a connection between the interior of the plunger and the conduit and having axially directed ports connected to conduit pressure through a hollowed valve stem, and surfaces adapted to close said ports when said valve is retracted to open the connection between the interior of said plunger and the conduit.

CHESTER W. LARNER.